US009481805B2

(12) United States Patent
Oomori et al.

(10) Patent No.: US 9,481,805 B2
(45) Date of Patent: Nov. 1, 2016

(54) COMPOSITION FOR FILM FORMATION, LAMINATE, FILM, SHEET BASE MATERIAL, METHOD FOR PRODUCING COMPOSITION FOR FILM FORMATION, AND METHOD FOR PREPARING A CELLULOSE DISPERSION

(71) Applicant: TOPPAN PRINTING CO., LTD., Tokyo (JP)

(72) Inventors: Yumiko Oomori, Tokyo (JP); Kosuke Shimizu, Tokyo (JP); Nao Nishijima, Tokyo (JP); Mitsuharu Kimura, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 29 days.

(21) Appl. No.: 14/222,212

(22) Filed: Mar. 21, 2014

(65) Prior Publication Data

US 2014/0206798 A1 Jul. 24, 2014

Related U.S. Application Data

(63) Continuation of application No. PCT/JP2012/073813, filed on Sep. 18, 2012.

(30) Foreign Application Priority Data

Sep. 22, 2011 (JP) .................................. 2011-207969
Sep. 29, 2011 (JP) .................................. 2011-215176

(51) Int. Cl.
*C09D 101/02* (2006.01)
*C08K 7/02* (2006.01)
(Continued)

(52) U.S. Cl.
CPC .............. *C09D 101/02* (2013.01); *C08B 15/04* (2013.01); *C08J 7/047* (2013.01); *C08L 1/04* (2013.01);
(Continued)

(58) Field of Classification Search
CPC .......... C08L 1/04; C08K 7/02; C09D 7/1291; C09D 101/02
See application file for complete search history.

(56) References Cited

U.S. PATENT DOCUMENTS 4,210,490 A    7/1980 Taylor
5,589,252 A    12/1996 Matsuo et al.
(Continued)

FOREIGN PATENT DOCUMENTS

EP    2 505 604 A1    10/2012
JP    7-164591    6/1995
(Continued)

OTHER PUBLICATIONS

Machine translation of JP 2011-057912A (detailed description); publication date: Mar. 24, 2011.*
(Continued)

*Primary Examiner* — Fred M Teskin (57) ABSTRACT

[Problem] To provide a composition for film formation comprising cellulose fibers, a layered inorganic compound, and a water-soluble polymer, which are each dispersed on nano level, a method for preparing a cellulose dispersion capable of forming a moisture-resistant film containing cellulose nanofibers, a gas-barrier laminate obtained by use of the dispersion, and a packaging material using the laminate. [Solution] A film-forming composition comprising at least cellulose fibers and a swollen inorganic compound is prepared. The method of preparing a cellulose dispersion comprises the steps of oxidizing cellulose, fibrillating the thus oxidized cellulose to prepare cellulose nanofibers, and adding a water-soluble polymer and inorganic particles to the dispersion containing the cellulose nanofibers.

15 Claims, 1 Drawing Sheet

(51) Int. Cl.

| | | |
|---|---|---|
| *C08L 1/04* | (2006.01) | |
| *C08B 15/04* | (2006.01) | |
| *C09D 101/04* | (2006.01) | |
| *C09J 175/04* | (2006.01) | |
| *C09D 7/12* | (2006.01) | |
| *C08J 7/04* | (2006.01) | |
| *C08L 29/04* | (2006.01) | |

(52) U.S. Cl.
CPC .......... *C09D 7/1275* (2013.01); *C09D 7/1291* (2013.01); *C09D 101/04* (2013.01); *C09J 175/04* (2013.01); *C08J 2401/02* (2013.01); *C08J 2401/04* (2013.01); *C08J 2403/02* (2013.01); *C08J 2405/08* (2013.01); *C08J 2429/04* (2013.01); *C08J 2475/00* (2013.01); *C08K 2201/008* (2013.01)

(56) References Cited

U.S. PATENT DOCUMENTS

| | | | |
|---|---|---|---|
| 5,645,923 | A | 7/1997 | Matsuo et al. |
| 6,720,072 | B1 | 4/2004 | Hinterwaldner et al. |
| 2003/0060542 | A1 | 3/2003 | Witt et al. |
| 2010/0316863 | A1 | 12/2010 | Kumamoto et al. |

FOREIGN PATENT DOCUMENTS

| | | |
|---|---|---|
| JP | 2001-247812 | 9/2001 |
| JP | 2002-194691 | 7/2002 |
| JP | 2002-527565 | 8/2002 |
| JP | 2003-525988 | 9/2003 |
| JP | 2006-52305 | 2/2006 |
| JP | 2008-1728 | 1/2008 |
| JP | 2008-240176 | 10/2008 |
| JP | 2008-308802 | 12/2008 |
| JP | 2009-57552 | 3/2009 |
| JP | 2009-67910 | 4/2009 |
| JP | 2010-90178 | 4/2010 |
| JP | 2010-184999 | 8/2010 |
| JP | 2011-57912 | 3/2011 |
| JP | 2011-68799 | 4/2011 |
| JP | 2012-149114 | 8/2012 |
| WO | WO 2008/103123 A2 * | 8/2008 |
| WO | WO 2010/074340 A1 | 7/2010 |
| WO | WO 2011/118520 A1 | 9/2011 |

OTHER PUBLICATIONS

International Search Report mailed Dec. 25, 2012, in corresponding International Application No. PCT/JP2012/073813.

European Office Action dated Mar. 20, 2015 in corresponding European Patent Application No. 12833257.4.

Japanese Office Action dated Jul. 28, 2016 in corresponding Japanese Patent Application No. 2013-534712.

* cited by examiner

COMPOSITION FOR FILM FORMATION, LAMINATE, FILM, SHEET BASE MATERIAL, METHOD FOR PRODUCING COMPOSITION FOR FILM FORMATION, AND METHOD FOR PREPARING A CELLULOSE DISPERSION

CROSS-REFERENCE TO RELATED APPLICATIONS

This application is a continuation of and claims the benefit of International Patent Application No. PCT/JP2012/073813, filed Sep. 18, 2012, and claims the foreign priority benefit of Japanese Patent Application No. 2011-207969, filed Sep. 22, 2011, and Japanese Patent Application No. 2011-215176, filed Sep. 29, 2011, the disclosures of which are incorporated herein by reference.

This invention relates to a composition for film formation, a laminate, a film, a sheet base material and a packaging material, which are produced by effective use of cellulose materials as a natural source, and also to a method for preparing a composition for film formation and a method for preparing a cellulose dispersion. The invention relates further to a gas barrier laminate formed by using the cellulose dispersion and a packaging material obtained by use of the gas barrier laminate.

In the field of packaging materials for foods and medicines, it is necessary for packaging materials to have barrier properties so as to protect contents by shielding against gases, such as oxygen, water vapor and the like, passing through the packaging material, and also to protect them from flavors and smells from inside and outside the packaging material and low molecular weight substances contained in films and adhesives, and also from light, etc.

There have been hitherto used, as the barrier material, aluminum and polyvinylidene chloride that are less susceptible to temperature and humidity. With aluminum, however, a problem is involved in that when aluminum is incinerated, the resulting incineration residue may be clogged in an exhaust port and the inside of an incinerator thereby lowering an incineration efficiency. With the incineration of polyvinylidene chloride, there arises a problem such as of occurrence of dioxins. Hence, there have been demanded substitutes with materials which are reduced in load on the environment.

With regard to substitute materials of aluminum and polyvinylidene chloride, as described, for example, in Patent Literature 1, partial substitution with aluminum or chlorine-free polyvinyl alcohol or ethylene/vinyl alcohol copolymers has been in progress although these materials are made of similar fossil resources. In this regard, future changes are expected to replace petroleum-derived materials by biomass materials.

Until now, attention has been paid to cellulosic materials as a new barrier material. Cellulose occupies approximately a half of biomass materials produced on the earth. Since cellulose is not only biodegradable, but also excellent in physical characteristics such as strength, elastic modulus, dimensional stability, heat resistance, crystallinity and the like, the applications thereof to functional materials have been expected. As is particularly set forth in Patent Literatures 2 and 3, it is known that cellulose nanofibers, obtained by dispersing oxidized cellulose obtained by oxidation reaction by use of 2,2,6,6-tetramethyl-1-piperidine-N-oxy radical catalyst (hereinafter referred to as TEMPO), are able to form a film. This film has, aside from the properties inherent to cellulosic materials, excellent transparency and barrier properties under dried conditions. In Patent Literature 4, there is described a barrier film including a moistureproof layer in addition to a cellulose nanofiber layer.

However, the film made of cellulose nanofibers has problem in that properties, such as barrier properties, lower owing to its moisture absorption and swelling under high humidity conditions. With the barrier films described in Patent Literature 4 and provided with the moistureproof layer along with the cellulose nanofiber layer, the moisture absorption and swelling of the cellulose nanofibers are significantly influenced, so that the above problem cannot be solved. Thus, there has been demanded a method of imparting a moisture resistance to the cellulose nanofibers per se so as to prevent the moisture absorption and swelling of the cellulose nanofibers.

Cellulose fibers are able to form a film which is excellent in strength and flexibility because of the structure where fibers are mutually, densely entangled. In this regard, however, such a structure has a number of interstices, which permit deterioration factors such as of water vapor, contaminants in air and the like to be readily infiltrated and permeated thereinto, thereby inviting the degradation of the film and an underlying base material. Especially, the infiltration of water vapor is undesirable because it serves to cause the lowering of performance of cellulose having high moisture absorption.

In order to improve the barrier properties of cellulose at high humidity, it is considered that a layered inorganic compound, such as mica or montmorillonite, is blended with cellulose fibers. Where a barrier layer is formed of a composition for film formation where a layered inorganic compound is mixed with cellulose fibers, the barrier properties are remarkably improved due to the tortuosity effect of the layered inorganic compound. In this regard, however, in order that high barrier properties are shown, it is necessary to increase an amount of layered inorganic compound. Nevertheless, if the amount of a layered inorganic compound exceeds a given level, a problem is involved in that the film strength (film cohesion) lowers considerably.

Where a barrier layer having low film strength is used as a packaging material, peeling strength sufficient for the packaging material cannot be obtained because of the weak strength of the barrier layer itself regardless of how firm its adhesion with a base material or sealant layer is.

Under these circumstances, as described in Patent Literature 5, there has been proposed a material comprising cellulose fibers, a layered inorganic compound, and a barrier material containing a water-soluble polymer. This enables the water-soluble polymer to be filled between the cellulose fibers and the layered inorganic compound thereby ensuring improved film strength of the barrier layer per se.

PRIOR-ART LITERATURE

Patent Literature

Patent Literature 1: Japanese Patent Application Publication No. H07-164591

Patent Literature 2: Japanese Patent Application Publication No. 2008-30882

Patent Literature 3: Japanese Patent Application Publication No. 2008-1728

Patent Literature 4: Japanese Patent Application Publication No. 2009-57552

Patent Literature 5: Japanese Patent Application Publication No. 2012-149114

SUMMARY OF THE INVENTION

Problem to be Solved by the Invention

With the barrier material set forth in Patent Literature 5, however, not only its strength has not been sufficient to withstand use as actual packaging material, but also an improvement in barrier properties, particularly, an remarkable improvement thereof at high humidity, could not be found.

The invention has been made in view of those set out above and has for its object the provision of a composition for film formation comprising cellulose fibers, an layered inorganic compound and a water-soluble polymer, which are, respectively, dispersed at nano levels, a method for producing such a composition for film formation, and a film formed of the composition for film formation. The invention also has as its object the provision of a sheet base material and a laminate, which are capable of further improving the barrier properties of cellulose film at high humidity and suppressing the infiltration and permeation, into the film, of water vapor and contaminants serving as deterioration factors. Additionally, the invention provides for its object the provision of a packaging material having film strength sufficient to withstand use although a layered inorganic compound is contained.

Further, because of the problem that a film containing cellulose nanofibers lowers in properties such as gas barrier properties due to the moisture absorption and swelling of the cellulose under high humidity conditions, there has been demanded a method for imparting cellulose nanofibers per se to moisture resistance.

To this end, the invention has been made to overcome the above problem and has for its object the provision of a method for preparing a cellulose dispersion capable of preparing a film containing moistureproof cellulose nanofibers.

Means for Solving the Above Problems

As means for solving the afore-stated problems, (1) a composition for film formation according to one embodiment of the present invention is characterized in that the composition for film formation contains at least cellulose fibers and a swollen layered inorganic compound.

It is preferred that an average particle size of the swollen layered inorganic compound is within a range of from 0.5 μm to 10 μm, more preferably from 3 μm to 7 μm.

It is also preferred that the average particle size of the swollen layered inorganic compound is from 1.01 to 5.00 times the size prior to swelling.

It is preferred that from 20 wt % to 100 wt % of water is contained in a solvent.

Preferably, a water-soluble polymer is further contained.

Further, it is preferred that the composition contains at least cellulose fibers and a swollen layered inorganic compound wherein its total light transmittance after dilution to 1% is within a range of from not less than 20% to not larger than 80%, more preferably from not less than 40% to not larger than 80%.

(2) A laminate according to another embodiment of the invention is characterized in that the composition for film formation of (1) above is dried and stacked on at least one surface of a base material.

Preferably, the haze value is at 5% or below.

It is preferred that a fracture strength of the film is not less than 1 N/15 mm in a direction perpendicular to the surface direction of the laminate.

(3) A film according to a further embodiment of the invention is characterized in that the composition for film formation as recited in (1) above is dried.

It is preferred that individual gaps between the layers of the layered inorganic compound are not less than 14 angstroms.

If the film has a thickness of 0.1-30 μm, the total light transmittance thereof is not less than 90% at a wavelength of 600 nm.

Further, it is characterized that the layered inorganic compound has a thickness of not less than 10 nm in a direction perpendicular to the surface direction of the film.

(4) A sheet base material according to a further embodiment of the invention is characterized in that the sheet base material is made of the film according to any one of (1) to (3) above.

(5) A packaging material according to a still further embodiment of the invention is characterized in that the packaging material makes use of the film as recited in any one of (1) to (3) above.

A packaging material according to another embodiment of the invention is characterized in that the packaging material is made of the film of (4) above.

A method for producing a composition for film formation according to another embodiment of the invention is characterized by comprising the step of mixing a dispersion of a swollen layered inorganic compound having an average particle size within a range of from not less than 0.5 μm to not larger than 7 μm and a dispersion of cellulose fibers having an average particle size of not larger than 300 nm.

Another embodiment of the invention made to solve the foregoing problems is directed to a method of preparing a dispersion of cellulose is characterized by comprising the steps of oxidizing cellulose, defibrating the oxidized cellulose to prepare cellulose nanofibers, and adding a water soluble polymer and inorganic particles to a dispersion containing the cellulose nanofibers.

In another embodiment of the invention, the step of adding the water-soluble polymer and the inorganic particles may be carried out by mixing an aqueous solution of the water-soluble polymer with the inorganic particles and subsequently agitated, followed by addition to the dispersion containing the cellulose nanofibers.

Further, in another embodiment of the invention, the step of adding the water-soluble polymer and inorganic particles may further include the heating step after mixing and agitation of an aqueous solution of the water-soluble polymer and the inorganic particles.

In still another embodiment of the invention, the step of adding the water-soluble polymer and inorganic particles may further include the steps of preparing a mixed dispersion of the water-soluble polymer and inorganic particles and subsequently adding to a dispersion containing the cellulose nanofibers, and heating the thus added dispersion.

In another embodiment of the invention, the step of adding the water-soluble polymer and inorganic particles may be carried out by adding the inorganic particles to a dispersion containing cellulose nanofibers and agitating, followed by addition of the water-soluble polymer thereto.

In a further embodiment of the invention, the step of adding the water-soluble polymer and inorganic particles may include, after addition of the inorganic particles to a dispersion containing the cellulose nanofibers and agitation, the step of heating the thus agitated dispersion.

In another embodiment of the invention, the step of adding the water-soluble polymer and inorganic particles may include, after preparation of a mixed dispersion of the cellulose nanofibers and the inorganic particles, the steps of adding the water-soluble polymer to the mixed dispersion and heating the thus added mixed dispersion.

A yet further embodiment of the invention is directed to a gas barrier laminate, characterized by coating the cellulose dispersion prepared according to the method of preparing a cellulose dispersion of the above embodiment onto at least one surface of a base material.

Yet another embodiment of the invention is directed to a packaging material, characterized in that a heat-sealable thermoplastic resin is stacked on the gas barrier laminate of the above embodiment through an adhesive layer.

Effects of the Invention

The invention can provide a composition for film formation containing cellulose fibers, a layered inorganic compound and a water soluble polymer which are dispersed at nanometer level, respectively, a method of producing the composition for film formation, and a film made of the composition for film formation. Further, there can be provided a sheet base material and a laminate using the film, which are imparted with moisture resistance and are further improved in barrier properties of a cellulosic film at high humidity and which can suppress the infiltration and permeation of deterioration factors, such as of water vapor, contaminants and the like, into the film. Moreover, there can be provided a packaging material provided with film strength sufficient to withstand use although a layered organic compound is contained.

The invention can provide a coating dispersion (i.e. a cellulose dispersion) capable of forming a gas barrier layer that is less susceptible to environmental load by use of cellulosic materials.

Further, the addition of water-soluble polymer ensures improved miscibility between cellulose nanofibers and inorganic particles and is able to provide a coating dispersion capable of forming a composite film which has high film strength and is improved in adhesion with a base material.

EMBODIMENT

Figure 1:
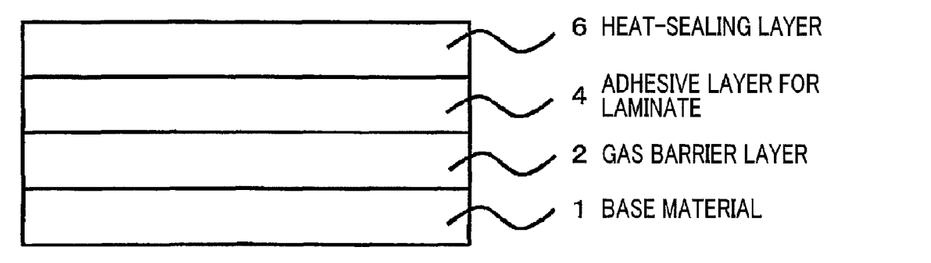
The FIGURE shows an example of a cross-sectional structure of a gas barrier laminate according to an embodiment of the invention.

An embodiment of the invention is now described.

The composition for film formation of this embodiment is characterized by comprising cellulose fibers, a layered inorganic compound and a water-soluble polymer. Further, the invention is also characterized in that the cellulose fibers, layered inorganic compound, and water soluble polymer are nano-dispersed.

The laminate of the embodiment is comprised of a base material and a barrier layer formed on at least one surface of the base material and containing at least the cellulose fibers and the water soluble polymer.

As the cellulose fibers contained in the barrier layer of the embodiment, there can be used those fibers having a fiber width within a range of between not less than 1 nm and not larger than 50 nm and a fiber length of several μm. When the fiber width is within the above range, there can be obtained a transparent, high-strength film. Especially, it is preferred that the fiber width is within a range of between not less than 1 nm and not larger than 10 nm, within which the cellulose fibers are more densely entangled, so that there can be obtained a film having excellent properties such as barrier properties and strength.

In the course of compositization with a layered inorganic compound, cellulose fibers are intercalated between the layers of the layered inorganic compound when subjected to nano-dispersion. This makes it possible to increase the moisture resistance and strength of the film.

The fiber width of cellulose fibers can be measured by dropping a droplet of an aqueous dispersion of 0.001 wt % of cellulose fibers onto a mica substrate and drying to provide a sample. For the measurement of the fiber width, the surface profile is observed, for example, with AFM (Nano Scope, manufactured by Veeco Instruments Inc.), and a difference in height between the mica substrate and the fibers is regarded as the fiber width.

Whether the entanglement of fibers is dense or not can be judged, for example, by surface observation using SEM (S-4800, manufactured by Hitachi High Technologies Corporation) or by measurement of a specific gravity of cast film. As to the measurement of the specific gravity of such a cast film, measurement can be made with a digital specific gravity meter (AND-DMA-220, manufactured by ANDO KEIKI CO., LTD.), and the cast film provided as a sample can be prepared by pouring a given amount of cellulose fiber aqueous dispersion into a rectangular casing made of polystyrene and heating and drying the dispersion at 50° C. over 24 hours.

According to the surface observation of the film containing cellulose fibers, the smaller number of interstices of the fibers and smaller size thereof lead to a smaller fiber width, and according to the measurement of specific gravity, a higher specific gravity results in a smaller fiber width, thereby obtaining a film made of densely entangled fibers. Accordingly, further reduction in number of the interstices between the fibers can prevent the infiltration and permeation of deterioration factors such as of water vapor, contaminants and the like into the film and thus, barrier properties of the barrier layer can be suppressed from lowing at high humidity.

In this embodiment, there is used a water-soluble polymer that is well compatible with cellulose as a material capable of filling the interstices existing inbetween the cellulose fibers in the film. The composite film prepared by mixing cellulose fibers and a water-soluble polymer is able to suppress infiltration and permeation of deterioration factors such as of water vapor, contaminants and the like and eventually serves as a film showing excellent barrier properties in a high humidity environment.

For the water-soluble polymers, there can be used one or two or more selected from synthetic polymers such as polyvinyl alcohol, ethylene-vinyl alcohol copolymer, polymethacrylic acid, polyacrylic acid, polyamine, polyurethane or derivatives thereof and water-soluble epoxy resins; and water-soluble polysaccharides such as polyuronic acid, starch, carboxymethyl starch, cationized starch, chitin, chitosan, carboxymethylcellulose, hydroxymethylcellulose, alginic acid, pectin, gelatin, guar gum, carrageenan, and derivatives thereof.

Among them, it is particularly preferred to select polyvinyl alcohol from the synthetic polymers. Polyvinyl alcohol having excellent film-forming properties, transparency, flexibility, etc., is well compatible with cellulose fibers, so that it is possible to readily fill the interstices inbetween the cellulose fibers and form a film having both strength and flexibility. In general, polyvinyl alcohol (PVA) is one that is obtained by saponifying polyvinyl acetate. The term "saponification" used herein means to include from so-called partially saponified PVA in which several tens of percent of an acetic acid group remains to fully saponified PVA in which only several percent of an acetic acid group is left.

Where polyvinyl alcohol is used as the water soluble polymer, it is especially preferred that the ratio by weight ((A)/(B)) of cellulose fibers (A) and polyvinyl alcohol (B) is within a range of 50/50 to 95/5. With the case where partially saponified PVA selected among polyvinyl alcohols is added, if the weight of the polyvinyl alcohol becomes larger than the weight of the cellulose fibers outside this range, wettability against substrates made of plastic materials is improved. Nevertheless, a dispersion containing a coating agent unfavorably becomes one which is susceptible to foaming.

On the other hand, with the case where fully saponified PVA selected among polyvinyl alcohols is added, when the weight of polyvinyl alcohol becomes larger than the weight of cellulose fibers outside the above range, the resulting dispersion becomes one which is less susceptible to foaming. However, wettability against substrates made of plastic materials lowers thereby unfavorably causing a crawling failure or the like.

With respect to the cellulose fibers according to this embodiment, a cellulose fiber dispersion can be obtained by the following method.

First, the microfibril surfaces of cellulose are oxidized by acting an N-oxyl compound serving as an oxidation catalyst and an oxidizer on a natural cellulose starting material in water or water/alcohol. Next, after removal of impurities, dispersion treatment is carried out in water or a mixed solution of water/alcohol to obtain a dispersion of the cellulose fibers.

For the starting natural cellulose, there can be used various types of wood pulps obtained from softwood, hardwood, etc., nonwood pulps obtained from kenaf, bagasse, straw, bamboo, cotton, seaweed, etc., cellulose obtained from sea squirts, cellulose produced by microbes, etc. Further, it is difficult for various gases and molecules to enter the inside of the cellulose crystals having many hydrogen bonds. Since the crystals are not loosened by the action of water (humidity), there can be obtained a dispersion of cellulose fibers having a high degree of crystallinity. The degree of crystallinity ranges from 50% to 99%, and is preferably as high as not less than 70%. In particular, cellulose I is preferred with respect to its crystal structure.

As the oxidation catalyst, a solution or suspension containing an N-oxyl compound, a co-oxidizer and an oxidizer is used. As the N-oxyl compound, there can be used TEMPO and derivatives thereof such as 4-acetamide-TEMPO, 4-carboxy-TEMPO, 4-phosphonooxy-TEMPO and the like. For the co-oxidizer, a bromide or iodine is preferred. Mention is made, for example, of an alkali metal bromide or alkali metal iodide. In particular, it is preferred to use sodium bromide having good reactivity. Usable oxidizers include, a halogen, hypohalous acid or salts thereof, halous acid or salts thereof, hydrogen peroxide, etc., of which sodium hypochlorite is preferred.

In the reaction dispersion containing starting cellulose and an oxidation catalyst, the pH at which the oxidation reaction proceeds efficiently differs depending on the combination of chemicals used. For example, where TEMPO, and sodium hypochlorite and sodium bromide, both serving as a co-catalyst, are contained, a preferred pH is within a range of not less than 9 to not larger than 12. Although it is sufficient that the temperature conditions of the oxidation reaction are within a range of between not lower than 5° C. and not higher than 70° C., a temperature of not higher than 50° C. is preferred when taking it into consideration that higher temperatures are more liable to cause side reactions.

With the oxidized cellulose, carboxyl groups are introduced on microfibril surfaces, and an osmotic pressure effect due to the mutual electrostatic repulsion between the carboxyl groups allows the microfibrils to readily become discrete (dispersed) on the order of nanometers. In particular, in case where water is used as a dispersion medium, the most stable dispersion state is given. In this regard, however, not only alcohols (such as ethanol, methanol, isopropanol, tert-butanol), but also ethers and ketones may be contained depending on the drying conditions or various purposes such as of improvement and control of liquid physical properties.

For the dispersion method of cellulose fibers, there can be used, for example, any one or a combination of a mixer, a high-speed homomixer, a high-pressure homogenizer, a ultrasonic homogenizer, grinder grinding, freeze pulverization, a media mill, and a ball mill.

The barrier layer of this embodiment may contain a siloxane compound in addition to the cellulose fibers and water soluble polymer. The siloxane compound is one in which a hydrolyzate of a silane-coupling agent is subjected to siloxane bonding by condensation polymerization. The cross-linked structure with the siloxane bonding has a significantly high effect of suppressing swelling of the cellulose, in addition to water resistance and adhesion to a base material. In particular, the siloxane compound obtained from tetraethyl orthosilicate has a high degree of cross-linked structure formed only from the siloxane bonds, so that infiltration of water vapor into the film can be most suppressed.

Other types of usable siloxane compounds include siloxane compounds obtained from various silane coupling agents such as 3-glycidoxypropyltrimethoxysilane, allyltriethoxysilane, 3-aminopropyltriethoxysilane, and 3-propyltrimethoxysilane acrylate. In this embodiment, there may be used these siloxane compounds by mixing two or more thereof.

The barrier layer of the embodiment further contains a layered compound. For the layered compound, there can be used kaolinite, dickite, nakhlite, halloysite, antigorite, chrysotile, pyrophyllite, montmorillonite, beidellite, hectorite, saponite, stevensite, tetrasilicic mica, sodium taeniolite, white mica, margarite, talc, vermiculite, brown mica, xanthophyllite, chlorite, etc. Commercial products include Sumecton SA (produced by Kunimine Industries Co., Ltd.) that has a saponite structure belonging to smectite based clay minerals, Kunipia-F (produced by Kunimine Industries Co., Ltd.) that is a sodium type of montmorillonite, and Bengel (produced by Hojun Co., Ltd.) that is refined natural bentonite.

Further, various types of synthetic micas (produced by Topy Industries, Ltd., Co-op Chemical Co., Ltd.), etc., may be used as a synthetic layered compound. In addition, layered compounds compositized with organic compounds may also be used. For example, mention is made of composite materials wherein quaternary ammonium ions having a long chain alkyl group are intercalated between layers through ion exchange. Commercially available products include Benton 27, Benton 38 (manufactured by Elementis Specialties Inc.), etc. In particular, if water is contained in the solvent, it is not necessary to intercalate an organic compound.

When a layered compound is contained in or inside a film, it is necessary for various gases and molecules to bypass the layered compound and pass through the film or sheet. Therefore, a layered compound having a great aspect ratio should preferably be used so as to keep good barrier properties. It is preferred to use montmorillonite from the viewpoint of cost and to use synthetic mica from the standpoint of barrier properties.

Further, since a layered compound having a large aspect ratio results in large-sized aggregates, particles whose size is not smaller than 10 μm can be confirmed through SEM or a microscope. When a non-dispersed and non-swollen layered compound exceeds 7 μm in size, the surface roughness develops and the resulting film becomes opaque along with the unlikelihood of improving barrier properties. The film becomes brittle and is weak in strength. Further, in a printing or bonding process for postprocessing, an ink or adhesive is not attached uniformly, strength becomes uneven, and an outer appearance becomes worsened. It is therefore preferred to use a layered inorganic compound having an average particle size of from 0.5 μm to 7.0 μm in dry state. More preferably, there is used a layered inorganic compound having an average particle size of from 0.5 μm to 4.0 μm, much more preferably from 1.5 to 3.5 μm.

If a layered inorganic compound in dried state has an average particle size of larger than 7 μm, dispersion becomes difficult as illustrated hereinbefore, and barrier properties, strength and outer appearance become worsened. In case where aggregates are observed in rare cases due to insufficient swelling treatment, a size of 4.0 μm or below leads to good dispersibility, and a size of 3.5 μm or below is more preferred because of high transparency. In contrast, when a dry particle size is smaller than 0.5 μm, good barrier properties cannot be shown. Especially, from the standpoint of barrier properties, a size of not smaller than 1.5 μm is preferred.

This embodiment is further characterized by a composition for film formation wherein an layered inorganic compound which has a relatively small average size in dried state is dispersed and swollen, under which an average particle size in solvent is larger than the average size in dried state. The average size in swollen state is preferably from not smaller than 0.5 μm to not larger than 10 μm. If the average particle size is smaller than this range, satisfactory barrier properties cannot be shown. If the average particle size is larger than this range, aggregates appear and are unevenly distributed in a film or sheet. Where swelling proceeds to a great extent, measurement with a particle size analyzer reveals a smaller size owing to the scattered dispersion.

Further, the average particle size of a swollen layered compound in the range of from 3 μm to 7 μm is more preferred. This is because transparency becomes high and dispersibility is good, and good barrier properties and high adhesion and strength are ensured. Especially, those having a swollen average particle size of from 3.5 μm to 6 μm are preferred: barrier properties become good, and dispersion and swelling proceed to optimal extents; and particularly, in a composite system with a water-soluble polymer, the water-soluble polymer is intercalated between the layers of layered inorganic compound, so that compositization is likely to proceed upon mixing with cellulose fibers.

When observed through SEM, etc., or measured by means of a particle size analyzer (e.g. SALD-2000 or SALD-7000 manufactured by SHIMADZU CORPORATION) after dispersion in a solvent such as, for example, water, etc., particularly without being subjected to swelling treatment, similar values are obtained with respect to the particle size in dried state. For instance, one having an average particle size of 3.0 μm by SEM observation in dried state has an average size of 3.0 μm by measurement with an aqueous dispersion size analyzer. However, when measured with a particle size analyzer after a layered compound as used above has been subjected to swelling treatment, the average particle size is at 5.0 μm.

Further, a ratio by weight between cellulose fibers and layered inorganic compound (weight of cellulose fibers/weight of layered inorganic compound) contained in the composition for film formation according to the embodiment is preferably within a range of 99/1 to 5/95. If the amount of layered inorganic compound is lower, satisfactory barrier properties cannot be obtained, particularly, under high humidity conditions. When the amount of layered inorganic compound is too large, flaking of the layered inorganic compound becomes insufficient, thereby unfavorably lowering the barrier properties or resulting in a film whose strength cannot be held and which is not flexible.

Further, the composition for film formation of the embodiment contains a swollen layered inorganic compound and is thus characterized in that its total light transmittance is from not less than 20% to not larger than 90% when it is diluted to 1%. It is generally considered that when dispersibility is improved for the same amount of layered inorganic compound, the total light transmittance is increased. However, with respect to the composition for film formation of this embodiment, not only dispersibility is improved, but also a layered inorganic compound is swollen. In addition, a water-soluble polymer and the cellulose fibers are intercalated between the layers to provide an entangled, complicated structure, so that as both dispersability and their compositization are advanced, the transmittance lowers. Thus, the film formed of the composition for film formation wherein the dispersibility and swelling or compositization of layered inorganic compound are advanced is improved in barrier properties and film strength and has a low haze value.

Accordingly, if the transparency is higher than the above range and even if dispersion is in progress, dispersibility is merely improved but swelling or compositization of the layered inorganic compound are not advanced. The resulting film becomes unsatisfactory with respect to an improvement in barrier properties and film strength. On the other hand, the case where the transparency is smaller than this range is unfavorable. This is because there may be some cases where the resulting film is low in transparency, becomes high in haze and is unsatisfactory in dispersibility.

Further, this embodiment is characterized in that a solvent is contained in the composition for film formation and water is contained in the solvent at from 20 wt % to 100 wt %. The water content within this range is preferred because dispersibilities of a layered inorganic compound, water-soluble polymer and cellulose fibers are improved and compositization is more advanced. Further, it is preferable to further contain an organic solvent for the purposes of improving a pot life and dispersion stability, etc., by suppressing foaming, increasing a drying efficiency, preventing spoilage and the like. Examples of the organic solvent include alcohols (ethanol, methanol, isopropanol, tert-butanol) and may include ethers, and ketones.

Further, additives may be added to the barrier layer in order to impart functionality. For example, it is possible to use, as an additive, a leveling agent, an antifoaming agent, a synthetic polymer, inorganic particles, organic particles, a lubricant, an ultraviolet absorber, a dye, a pigment, a stabilizer or the like. These additives may be added to a coating dispersion within ranges not impairing barrier properties, and are also able to improve film characteristics depending on the intended use.

Next, a method for preparing the composition for film formation according to another embodiment is now described.

In this embodiment, cellulose fibers, layered inorganic compound and water-soluble polymer are dispersed very well, and the cellulose fibers and water-soluble polymer are intercalated between the layers of the layered inorganic compound thereby providing a very complicated composite structure. Accordingly, the invention has the greatest feature in that the layered inorganic compound is swollen. To achieve this, the following procedure is carried out.

Initially, a layered inorganic compound, prior to swelling, having an average article size of from 0.5 µm to 7 µm is swollen. A composition for film formation can be prepared by mixing a defibrillated cellulose dispersion and the layered inorganic compound.

As stated hereinbefore, the average particle size after swelling is preferably at 0.5 µm to 10 µm, more preferably at 3 µm to 7 µm. Within this range, no limitation is placed particularly on the manner of swelling. An instance of a swelling method is described below.

First, a layered inorganic compound is dispersed in water. At this stage, swelling is hardly advanced. When the dispersion is subjected to various physical treatments, the layered inorganic compound can be swollen. For the physical treatments, mention is made, for example, of any one of a stirrer, a mixer, a high-speed homomixer, a high-pressure homogenizer, an ultrasonic homogenizer, grinder grinding, freeze pulverization, a media mill, a ball mill, or a combination thereof.

The swelling can be more promoted by controlling physical treating conditions such as time, the number of treatments, pressure, temperature, etc. In this regard, however, with respect to time, the number of treatments and pressure, if such treating conditions are set too severely, the layered inorganic compound is broken and disrupted in the in-plane thereof. The in-plane disruption leads to a lowering of barrier properties although dispersibility and swelling property are improved. However, when the treating conditions is too mild, dispersion and swelling do not proceed. Accordingly, it is preferable to use, for physical treatment, a mixer, a high-speed homomixer, a low-pressure homogenizer, or an ultrasonic homogenizer. With regard to temperature, higher temperatures permit dispersion and swelling to more proceed unless the composition is changed as a result of vaporization, decomposition, etc., of the solvent used.

In order to promote swelling while suppressing the disruption to an extent as far as possible, there may be added surfactants, dispersants, inorganic salts, organic salts, organic compounds, etc., to various dispersion aids.

The composition for film formation according to the embodiment is characterized by comprising a water-soluble polymer. When the water soluble polymer is intercalated between the layers of a layered inorganic compound, swelling is more promoted. Accordingly, it is most preferred to add a water-soluble polymer during the course of dispersion and swelling treatments of layered inorganic compound.

The water-soluble polymer is able to improve adhesion strength at the interfaces between the cellulose fibers and the layered inorganic compound. This mechanism is not known yet: when rigid cellulose fibers and a hard layered inorganic compound are mutually contacted with each other, gaps are generated therebetween. When a water-soluble polymer having flexibility is entered into those gaps, adhesion strength at the respective interfaces can be improved.

Although no limitation is placed particularly on a ratio of the layered inorganic compound and the water-soluble polymer, the water-soluble polymer can be added at a ratio by weight of from 0 to 5000, preferably from 0 to 1000, relative to 100 of the layered inorganic compound. When the amount of the water-soluble polymer is small, the dispersion and swelling of the layered inorganic compound becomes insufficient, with the attendant problems that the resulting film having non-swollen compound is low in barrier properties and becomes opaque and the stability of dispersion becomes poor. On the other hand, when the amount of the water-soluble polymer exceeds the above range and the water-soluble polymer is made of a synthetic polymer, the degree of biomass usage becomes small. Especially, under a high humidity condition, some problems occur such that barrier properties lower and a water resistance lowers.

More preferably, the water-soluble polymer may be added at a ratio of 100 to 500 relative to 100 of the layered inorganic compound. When the amount of the water-soluble polymer is within this range, the water-soluble polymer is intercalated between individual layers of the layered inorganic compound. At this time, because the amount of the water-soluble polymer enables the layered inorganic compound to be swollen and its surplus amount is small, so that barrier properties can be well shown.

The layered inorganic compound can be added to in the course of the afore-stated defibration treatment of cellulose fibers. The addition of the layered inorganic compound results in simultaneous treatments including the defibration treatment of cellulose fibers and the exfoliation treatment of the layered inorganic compound. For a dispersion means, there can be used one or two or more selected from a mixer treatment, a blender treatment, a ultrasonic homogenizer treatment, a high pressure homogenizer treatment, and a ball mill treatment. In this case, the water soluble polymer may be added either before or after the defibrating treatment.

When the above dispersion means is used, both the defibration of the cellulose fibers and the break-into-flakes treatment of the layered inorganic compound can be performed simultaneously. Even if aqueous dispersions wherein cellulose fibers and a layered inorganic compound are, respectively, dispersed are mixed, there may be some cases where the respective materials are not mixed uniformly and there cannot be obtained a film having excellent transparency, barrier properties and film strength as in this embodiment.

When using such a dispersion means as set out above, the layered inorganic compound is broken into flakes and finely pulverized. This treatment enables coarse particles to be reduced into fine ones. If coarse particles exist, coarse inorganic particles project from the film surface, with the possibility that an adhesive cannot be coated uniformly, resulting in the lowering of adhesion.

Further, there may be used a procedure of heating a dispersion of a mixture of cellulose and layered inorganic compound or a mixture of cellulose, water-soluble polymer and layered inorganic compound.

Using this technique makes it possible to exfoliate a layered inorganic compound in the dispersion by application of heat energy. The heating temperature and time may be such that the time ranges from 40° C. to 100° C. and the time ranges from 10 minutes to 20 hours. When taking it into account that the layered compound is broken to lower barrier properties, it is preferred that the temperature ranges from 40° C. to 90° C. and time ranges from 10 minutes to 5 hours.

When a supersonic homogenizer or high-pressure homogenizer is used to exfoliate a layered inorganic compound, the layered inorganic compound is broken into pieces and thus, barrier properties may become worsened in some cases.

As previously stated, there may be used a technique of adding a cellulose dispersion after mixing of a water-soluble polymer and a layered inorganic compound. When a layered inorganic compound having high affinity for water-soluble polymer is used, it is possible to obtain a barrier film of better quality than in the case where cellulose is directly added. This is considered for the reason that where a layered inorganic compound and a water-soluble polymer are initially mixed, the water-soluble polymer is intercalated between the layers of the layered inorganic compound more efficiently to expand the spaces between the respective layers thereby providing a film having a more complicated structure.

The dispersion obtained by mixing the water-soluble polymer and layered inorganic compound may be heated. Upon heating of the dispersion, the layered inorganic compound undergoes exfoliation, thereby ensuring better barrier properties. The heating temperature and time include from 40° C. to 100° C. for the temperature and from 10 minutes to 20 hours for the heating time. When taking it into consideration that the layered compound is broken into pieces to lower barrier properties, a temperature of from 50° C. to 90° C. and a time of from 10 minutes to 5 hours are preferred. In this regard, however, where this technique is adopted, a certain effect can be obtained when mere agitation over 10 minutes to 20 hours is effected without heating. The above treatment enables the surface area of the layered inorganic compound to be widened, for which where the water-soluble polymer is not added sufficiently, interstices of cellulose fibers and the layered inorganic compound cannot be filled, with the possibility that film strength and adhesion become worsened.

In the present embodiment, the mixed dispersion is added to a cellulose dispersion. On this occasion, it is preferred to add the mixed dispersion of the layered inorganic compound and the water-soluble polymer while agitating the cellulose dispersion.

Subsequently, the mixed dispersion can be heated after the addition of the cellulose dispersion. This permits the layered inorganic compound to be exfoliated in a similar way thereby improving barrier properties. The heat temperature and time are from 40° C. to 100° C. for the temperature and from 10 minutes to 20 hours for the heating time. However, when it is taken into account that the breakage of layered inorganic compound into pieces results in the lowering of barrier properties, a temperature of 50° C. to 90° C. and a time of 10 minutes to 5 hours are preferred.

In the embodiment, cations present between the layers of the layered inorganic compound may be substituted. When interlayer cations present between the layers of the layered inorganic compound are contacted with a solution containing ions such as of ammonia, tetraethylammonium hydroxide, tetrabutylammonium hydroxide, or the like, a substitution reaction occurs instantaneously, so that cation exchange can be completed. When the cation substitution is performed during the process of adding the layered inorganic compound, the layer-to-layer gaps of the layered inorganic compound can be widened to obtain better barrier properties.

The substitution of cations can be performed in a dispersion of layered inorganic compound. Alternatively, it can be carried out either after addition to the cellulose dispersion or after addition to the water-soluble polymer solution.

Besides, there may be used a procedure of adding to the system after freeze-pulverization of layered inorganic compound or after mortar pulverization subsequent to drying of layered inorganic compound. These procedures enable the layered inorganic compound to be more finely pulverized and take a complicated structure, thereby leading to improved barrier properties.

In this way, the dispersed state of the materials contained in the barrier layer-forming composition greatly influences the transparency, barrier properties, etc., when formed as a film. Especially, when dispersion is insufficient and non-uniform, film transparency and barrier properties lower considerably. The barrier properties are improved when the water-soluble polymer is intercalated between the layers of the layered inorganic compound, and film strength is improved by filling the gaps between the layered inorganic compound and the cellulose fibers with the water-soluble polymer. When the layered inorganic compound is broken into fine pieces and dispersed, there can be formed a film whose smoothness is kept and which is high is adhesion.

Additives may be further added to the coating dispersion according to the embodiment of the invention so as to impart functionality. For example, it is possible to use a leveling agent, an antifoaming agent, a synthetic polymer, inorganic particles, organic particles, a lubricant, an ultraviolet absorber, a dye, a pigment, a stabilizer, etc. These can be added to the coating dispersion within ranges not impairing gas barrier properties, and may also improve film characteristics depending on the intended use.

For a method of forming a gas barrier layer, known coating methods can be used including, for example, those using a roll coater, a reverse roll coater, a photogravure coater, a micro-photogravure coater, a knife coater, a bar coater, a wire bar coater, a die coater, a dip coater, etc. Using the above coating methods, at least one side of a substrate is coated. For a drying method, there can be used natural drying, air-blow drying, hot-air drying, UV drying, hot roll drying, infrared-ray irradiation, etc.

In order to improve film strength and adhesion, UV irradiation or EB irradiation treatment may be performed after formation of the gas barrier layer.

Further, a gas barrier may be laminated thereon with an intermediate film layer, a heat-sealable thermoplastic resin layer (i.e. a heat-sealing layer), a printing layer, etc., if necessary, thereby providing a packaging material. In addition, an adhesive layer (i.e. an adhesive layer for lamination) for lamination by a dry lamination method or a wet lamination method, or a primer layer, an anchor coat layer, etc., in case where a heat-sealing layer is laminated using a melting extrusion method may also be stacked.

Configuration examples (a)-(c) are shown, in which a gas barrier laminate of the embodiment of the invention is used as a packaging material. However, the gas barrier laminate according to the embodiment of the invention is not limited thereto.

(a) Base material 1/gas barrier layer 2/adhesive layer 4 for lamination/heat-sealing layer 6 (see FIGURE)
(b) Base material 1/gas barrier layer 2/printing layer/adhesive layer 4 for lamination/heat-sealing layer 6
(c) Base material 1/gas barrier layer 2/adhesive layer 4 for lamination/intermediate film layer/adhesive layer 4 for lamination/heat-sealing layer 6.

The intermediate film layer is provided to enhance bag breakage strength at the time of boiling and retort sterilization, and is usually selected from a biaxially stretched nylon film, a biaxially stretched polyethylene terephthalate film, and a biaxially stretched polypropylene film from the viewpoints of machine strength and heat stability. The thickness is determined depending on the type of material and required quality, etc., and is generally in the range of 10 μm to 30 μm. The lamination is feasible by a dry lamination method wherein an adhesive such as a two-component urethane resin is used for lamination. In case where a base material 1 having gas permeability, such as paper, is used, lamination is possible by a wet lamination method using a starch-based, water-soluble adhesive, or an aqueous adhesive such as a vinyl acetate emulsion.

The heat-sealing layer 6 is provided as a sealing layer for forming a bag-shaped packaging body, etc. For instance, there may be used a film of a resin such as polyethylene, polypropylene, ethylene vinyl acetate copolymer, ethylene-methacrylic acid copolymer, ethylene-methacrylic acid ester copolymer, ethylene-acrylic acid copolymer, ethylene-acrylic acid ester copolymer, or a metal cross-linked product thereof. Although the thickness of the heat sealing layer 6 is determined according to the purpose, it is generally within a range of 15 μm to 200 μm. For a formation method, usual practice is to use a dry lamination method or the like wherein a film serving as the heat sealing layer 6 is bonded by use of an adhesive such as a two-component urethane resin. Anyway, the lamination can be effected by any of known methods.

As an adhesive used as the adhesive layer 4 for lamination, known adhesives can be used depending on the types of materials of the respective layers to be laminated, including acryl-based, polyester-based, ethylene vinyl acetate-based, urethane-based, vinyl chloride vinyl acetate-based, and chlorinated polypropylene-based adhesives. For a coating method of an adhesive for forming the adhesive layer 4 for lamination, known coating methods can be used, for which there are used, for example, a roll coater, a reverse roll coater, a gravure coater, a micro-gravure coater, a knife coater, a bar coater, a wire bar coater, a die coater, a dip coater, etc. The coating amount of the adhesive is preferably in the range of 1 g/m$^2$-10 g/m$^2$.

The printing layer is formed for practical use as a packaging bag, and is one made of an ink in which various type of pigments, extender pigments and additives, such as a plasticizer, a drying agent, a stabilizer, etc., are added to ordinarily employed ink binder resins, such as urethane-based, acryl-based, cellulose nitrate-based, rubber-based and vinyl chloride-based resins. Characters, patterns, etc., are formed thereon.

The film and sheet of a further embodiment are now described. The film and sheet of the embodiment can be formed by various types of coatings, castings, filterings, etc. More particularly, they can be prepared by coating differently shaped base materials with the composition for film formation of the embodiment according to various types of coating methods, followed by drying solvent. This will be explained hereinlater with regard to the illustration of laminate.

The base material may be replaced by a porous body, or the steps of dehydration and filtration may be introduced prior to the drying. The film and sheet can be made by adding a gelling agent or a poor solvent to the film-forming composition to form a solid matter or gel, following by filtration, dehydration and drying. The film and the sheet according to the embodiment contains a layered inorganic compound. An ordinary layered inorganic compound has a layer-to-layer gap of approximately 12 angstroms. For example, synthetic mica and montmorillonite prior to swelling has been found to have a layer-to-layer gap of 12 angstroms. The layer-to-layer gap can be measured by an X ray diffraction method using a bulk material obtained by drying the film-forming composition, the film or sheet formed. To read out from the diffraction peaks is the most accurate and simplest.

The film and sheet of the embodiment are characterized in that the layer-to-layer gap of the layered inorganic compound determined by X-ray diffraction is not smaller than 14 angstroms. This demonstrates that the layered inorganic compound is swollen, under which it forms a composite material along with cellulose fibers and a water-soluble polymer thereby forming the film or sheet. If the layer-to-layer gap is at 14 angstroms or over, compositization proceeds, with the result that the swelling of the cellulose fibers and water-soluble polymer under high humidity conditions can be suppressed. Because of the complexity of paths through which various gases pass and the like, barrier properties are improved. Additionally, film permeability becomes high.

More preferably, the layered inorganic compound has a layer-to-layer gap of not less than 17 angstroms, under which compositization with cellulose fibers especially proceeds. This is considered for the reason that cellulose molecules at the sites of cellulose fibers where fluffed are considered to have a size of about 5 angstroms and are intercalated between the respective interlayer gaps, thereby permitting the compositization to proceed.

Next, the method for making a laminate of the embodiment is described. The laminate of the embodiment can be obtained by coating the film-forming composition of the embodiment onto at least one surface of a base material and drying. For the base material, plastic materials made of a variety of polymer compositions can be used.

The plastic materials include, for example, polyolefins (polyethylene, polypropylene and the like), polyesters (polyethylene terephthalate, polyethylene naphthalate and the like), cellulose-based materials (triacetyl cellulose, diacetyl cellulose, cellophane and the like), polyamides (6-nylon, 6,6-nylon and the like), acrylic resins (polymethylmethacrylate and the like), polystyrene, polyvinyl chloride, polyimides, polyvinyl alcohol, polycarbonates, ethylene vinyl alcohol, etc. Additionally, there may be used organic polymer materials having at least one component or copolymeric component, or a chemically modified component thereof selected among those components of the above-indicated plastic materials.

In recent years, there has been demanded the use of materials capable of reducing an environmental load even if only slightly. To this end, there may be used, as a base material of the embodiment, bioplastics chemically synthesized from plants, such as biopolyolefins, base materials containing plastics produced by microorganisms, such as hydroxyalkanoates, or papers obtained through the pulping and paper-making steps of woods, and plants and trees. Alternatively, there may be used base materials containing cellulosic materials and including cellophane, acetylated cellulose, cellulose derivatives and cellulose nanofibers.

In order to improve adhesion with the respective layers, the base material of the embodiment can be preliminarily subjected, on the surfaces thereof, to surface modification such as by corona treatment, plasma treatment, frame treatment, ozone treatment, or anchor coating treatment.

As a base material of the embodiment, there may be used a base material subjected to vacuum deposition of ceramics. For the vacuum deposition of ceramics, there can be used, for example, those vacuum depositions of aluminum oxide, magnesium oxide, tin oxide, silicon oxide and the like. Film-forming methods include a vacuum vapor deposition method, a sputtering method, a plasma vapor phase epitaxial method, etc.

The shape of the base material is not particularly limited and can be appropriately selected from various types of moldings, such as a film, a bottle, a cylinder and the like, although depending on the intended use thereof. Especially, when taking into consideration the transparency or flexibility of the cellulose fibers contained in the gas barrier layer, the base material is preferably in the form of a film and thus, a plastic film can be favorably employed. The film-shaped base material may be either stretched or non-stretched and should favorably have good mechanical strength and dimensional stability. For instance, mention is favorably made of biaxially, arbitrarily stretched polyethylene terephthalate film and polyamide film. Moreover, the base material used may be one which is imparted with functionality by adding various types of known additives and stabilizing agents such as, for example, a plasticizer, a lubricant, an antioxidant, an ultraviolet-ray inhibitor and the like.

It is possible to select the base materials appropriately depending on the intended use. For example, in case where the laminate is used as a packaging material, a polyolefin-based, polyester-based, or polyamide-based film is favorable from the viewpoints of price, mositureproofing, packageability, texture and disposability. For an eco-friendly material, paper, a polylactate film, and a polyurethane and a polyester that are synthesized from biomass raw materials, respectively, are more preferred.

For the film-forming method of the composition for film formation of the embodiment, know coating methods can be used including those using a roll coater, a reverse roll coater, a gravure coater, a micro gravure coater, a knife coater, a bar coater, a wire bar coater, a die coater, a dip coater, etc. Using the above coating methods indicated above, the composition for film formation is coated onto at least one surface of a base material. For drying, natural drying, air blow drying, hot air drying, UV drying, hot roll drying, infrared-ray irradiation, etc., can be used.

The film strength or adhesion may be improved by further subjecting to UV irradiation or EB irradiation treatment after the film formation.

The laminate of the embodiment is characterized in that its haze value is not larger than 5%. This depends on the fact that cellulose fibers are fully fine on nano level and that a layered inorganic compound is fully dispersed. When the laminate has a haze value of not larger than 5%, the use of the laminate as a packaging material is advantageous in that the contents can be confirmed from outside.

If necessary, the film and sheet of the embodiment may be laminated with an intermediate film layer, a heat-sealable thermoplastic resin layer (heat-sealing layer), a printing layer, etc., for use as a packaging material. In addition, an adhesive layer (adhesive layer for lamination) for laminating respective layers using a dry lamination method or a wet lamination method, or a primer layer, an anchor coat layer, etc., for lamination of a heat-sealing layer by a melt extrusion method may also be laminated. With impartment of better barrier properties, a vacuum-deposition layer of a metal or metal oxide may be stacked.

Configuration examples (a)-(c) are shown, in which the laminate of this embodiment is used as a packaging material. However, the laminate of the embodiment should not be construed as limited thereto.

(a) Base material/barrier layer/adhesive layer for lamination/heat-sealing layer
(b) Base material/barrier layer/printing layer/adhesive layer for lamination/heat-sealing layer
(c) Base material/barrier layer/adhesive layer for lamination/intermediate film layer/adhesive layer for lamination/heat-sealing layer.

The intermediate film layer is provided to enhance the bag breakage strength during boiling and retort sterilization. In general, the intermediate film layer is selected, in most cases, from a biaxially stretched nylon film, a biaxially stretched polyethylene terephthalate film, and a biaxially stretched polypropylene film from the viewpoints of machine strength and heat stability. The thickness is determined according to the type of material, required quality, etc., and is generally within a range of 10 µm to 30 µm. For the formation, this layer can be laminated by a dry lamination method using an adhesive, such as a two-component curable urethane resin or the like, for bonding. Where a base material having good gas permeability, such as paper, is used, lamination is feasible according to a wet lamination method using a starch-based aqueous adhesive or an aqueous adhesive such as a vinyl acetate emulsion.

The heat-sealing layer is provided as a sealing layer for forming a bag-shaped package, etc. For example, there is used a film made of one kind of resin such as polyethylene, polypropylene, an ethylene vinyl acetate copolymer, an ethylene-methacrylic acid copolymer, an ethylene-methacrylic acid ester copolymer, an ethylene-acrylic acid copolymer, an ethylene-acrylic acid ester copolymer, or a metal crosslinked product thereof. Although the thickness of the heat sealing layer is determined depending on the purpose, the thickness is generally within a range of 15 µm-200 µm. For the formation, usual practice is to use a dry lamination method of bonding the film by use of an adhesive, such as a two-component curable urethane resin. Nevertheless, any of the films can be laminated by known methods.

As an adhesive usable as the adhesive layer for lamination, known adhesives including an acryl-based, polyester-based, ethylene vinyl acetate-based, urethane-based, vinyl chloride-vinyl acetate-based and chlorinated polypropylene-based adhesives can be used although depending on the types of materials of individual layers to be laminated. As a coating method of an adhesive for forming the adhesive layer for lamination, known coating methods can be used including, for example, those using a roll coater, a reverse roll coater, a gravure coater, a micro gravure coater, a knife coater, a bar coater, a wire bar coater, a die coater, a dip coater, etc. The coating amount of the adhesive is preferably at 1-10 g/m$^2$.

The printed layer is formed in order to be practically used as a packaging bag or the like, and is one formed of an ink. The ink is made of an ordinarily employed ink binder resin, such as a urethane, acryl, nitrocellulose, rubber, vinyl chloride or the like resin, to which additives such as various types of pigments, extender pigments, plasticizers, drying agents, stabilizers and the like, are added, thereby forming characters, designs, etc.

According to the embodiment stated above, there can be provided a barrier laminate which has a reduced burden on environment due to the use of cellulose materials.

The method for preparing a cellulose dispersion (hereinafter referred to simply as "coating dispersion") according to still another embodiment of the invention is described in detail. The coating dispersion of the embodiment of the invention is made up of one that contains cellulose nanofibers (hereinafter referred to simply as "cellulose fibers"), a water-soluble polymer and a layered inorganic compound. It will be noted that the term "inorganic particles used herein corresponds to "layered inorganic compound" indicated in the foregoing embodiments.

Example 1

The embodiments of the invention are particularly described by way of examples. It is to be noted that the invention should not be construed as limited to these examples.

The respective materials of cellulose fibers, water-soluble polymers, layered compounds indicated below were mixed at formulation ratios indicated in Table 1 to prepare coating dispersions.

with ion-exchanged water and agitated for about 60 minutes using a high-speed rotation mixer to obtain a dispersion of transparent cellulose fibers.

To the dispersion of the cellulose fibers were added an aqueous solution (which was obtained by weighing 5 g of PVA-124, manufactured by KURARE CO., LTD. in a beaker, adding 500 g of pure water, and heating for dissolution to a temperature of 100° C. to provide a 1% solution) of polyvinyl alcohol serving as a water-soluble polymer, a water-soluble polyurethane (WD-725 of Mitsui Chemicals, Inc.), a chitosan aqueous solution (made by Dainichiseika Color & Chemicals Mfg. Co., Ltd., and prepared by dissolving PVL in an acetic acid aqueous solution at a solid concentration of 2%), and a starch aqueous solution (prepared by dispersing water-soluble starch in water at a solid concentration of 4% and heating at 90° C. for 1 hour). Kunipia and synthetic mica were, respectively, used as a layered inorganic compound after dilution with water to make a solid concentration of 1%.

TABLE 1

|  | Example 1-1 | Example 1-2 | Example 1-3 | Example 1-4 | Example 1-5 | Example 1-6 |
|---|---|---|---|---|---|---|
| Layered inorganic compound | Kunipia | Kunipia | Kunipia | Kunipia | Synthetic mica | Synthetic mica |
| Average particle size | 0.5 | 0.5 | 0.5 | 0.5 | 3 | 3 |
| Formulation ratio | 1 | 1 | 1 | 1 | 1 | 1 |
| Water-soluble polymer | Polyvinyl alcohol | Polyvinyl alcohol | Water-soluble polyurethane | Starch | Polyvinyl alcohol | Polyvinyl alcohol |
| Formulation ratio | 1 | 5 | 1 | 1 | 1 | 5 |
| Agitation temperature | 30 | 80 | 30 | 80 | 80 | 80 |
| Water | 98 | 94 | 98 | 94 | 98 | 94 |

|  | Example 1-7 | Example 1-8 | Comp. Ex. 1-1 | Comp. Ex. 1-2 | Example 1-9 | Example 1-10 |
|---|---|---|---|---|---|---|
| Layered inorganic compound | Synthetic mica | Synthetic mica | Kunipia | Synthetic mica | Kunipia | Synthetic mica |
| Average particle size | 6 | 3 | 0.5 | 3 | 0.5 | 3 |
| Formulation ratio | 1 | 1 | 1 | 1 | 1 | 1 |
| Water-soluble polymer | Polyvinyl alcohol | Chitosan | — | — | — | — |
| Formulation ratio | 5 | 1 | 0 | 0 | 0 | 0 |
| Agitation temperature | 80 | 30 | 30 | 30 | 80 | 80 |
| Water | 94 | 98 | 99 | 99 | 98 | 94 |

[Method of Preparing Cellulose Fibers]

10 g of bleached kraft pulp was allowed to stand in 500 ml of water overnight, thereby swelling the pulp, followed by adjusting the temperature to 20° C. and adding 0.1 g of TEMPO and 1 g of sodium bromide to provide a pulp suspension. While agitating, 10 mmols/g of sodium hypochlorite per unit weight of the cellulose was added. On this occasion, about 1 N of a sodium hydroxide aqueous solution was added in order to keep the pH of the pulp suspension at approximately 10.5, followed by reaction for 240 minutes and rinsing well with water to obtain pulp. The resulting pulp was adjusted to a solid concentration of 1%

Examples 1-1-1-10

Preparation of Compositions for Film Formation in Examples 1-1-1-10

Different types of layered inorganic compounds and water soluble polymers were mixed and agitated with agitation blades using the formulation ratios and conditions of Table 1. The resulting dispersions were each added to 100 parts of a dispersion of cellulose fibers at a ratio indicated in Table 2 thereby preparing film-forming compositions of Examples 1-1 to 1-10.

TABLE 2

|  | Example 1-1 | Example 1-2 | Example 1-3 | Example 1-4 | Example 1-5 | Example 1-6 |
|---|---|---|---|---|---|---|
| 1% transmittance (600 nm) | 62 | 50 | 40 | 48 | 60 | 54 |
| Average particle size after swelling | 0.7 | 1.5 | 0.6 | 5 | 3.3 | 5.5 |
| Amount added to cellulose dispersion (based on cellulose dispersion taken as 100) | 50 | 30 | 10 | 50 | 50 | 10 |
| Average particle size of composition for film formation | 0.7 | 1.5 | 0.6 | 5 | 3.3 | 5.5 |
| Oxygen permeability at 30° C. and 70% | 1.8 | 1.2 | 1.5 | 2 | 0.1 | 0.7 |
| Haze of laminate | 4.2 | 3.8 | 3.5 | 3.8 | 4.5 | 3.8 |

|  | Example 1-7 | Example 1-8 | Comp. Ex. 1-1 | Comp. Ex. 1-2 | Example 1-9 | Example 1-10 |
|---|---|---|---|---|---|---|
| 1% transmittance (600 nm) | 52 | 62 | 81 | 82 | 68 | 72 |
| Average particle size after swelling | 8.5 | 12 | 0.5 | 3 | 1.2 | 4.2 |
| Amount added to cellulose dispersion (based on cellulose dispersion taken as 100) | 10 | 10 | 50 | 10 | 50 | 10 |
| Average particle size of composition for film formation | 8.5 | 12 | 0.5 | 3 | 1.2 | 4.2 |
| Oxygen permeability at 30° C. and 70% | 1.4 | 2.1 | 5.2 | 4.8 | 2.8 | 3.5 |
| Haze of laminate | 3.5 | 4.8 | 5.4 | 5.1 | 4.2 | 3.9 |

The coating dispersions prepared by use of the formulation ratios and the dispersion preparation procedure indicated as formulations 1-1-1-10 of Table 1 were each coated onto a 25 µm thick polyethylene terephthalate film (Polyester film E5102, made by Toyobo Co., Ltd.) according to a bar coating method in a dry thickness of 1.0 µm and dried to form a barrier layer, thereby preparing barrier films.

[Preparation of a Barrier Film for Packaging Material in Example 1-1]

Further, in order to use the thus prepared barrier films as a packaging material, a heat sealing layer was bonded to the barrier layer side through an adhesive layer for lamination and aged at 50° C. for 4 days to provide barrier films for use as a packaging material. The heat-sealing layer used was 70 µm thick CPP (RXC22, made by Mitsui Chemicals Tohcello, Inc.), and an adhesive used to form the adhesive layer for lamination was an adhesive for two-component curable polyurethane lamination (A525/A52 produced by Mitsui Chemicals Polyurethanes, Inc.). The adhesive was coated onto the barrier layer by a gravure coating method so that the coating amount after drying was at 4.0 g/m².

Example 2

Examples of the invention are more particularly described below, which should not be construed as limiting the invention thereto.

The respective materials of cellulose fibers, a water soluble polymer, and layered minerals indicated below were mixed at formulation ratios indicated in the table thereby preparing coating dispersions.

[Method 1 of Preparing Cellulose Fibers]

10 g of bleached kraft pulp was allowed to stand in 500 ml of water overnight to cause the pulp to be swollen, followed by adjusting the temperature to 20° C. and further adding 0.1 g of TEMPO and 1 g of sodium bromide thereby obtaining a pulp suspension. While agitating, 10 mmols/g of sodium hypochlorite per unit weight of the cellulose was added. On this occasion, about 1 N of a sodium hydroxide aqueous solution was added so that the pH of the pulp suspension was kept at about 10.5. Thereafter, oxidation reaction was performed for 240 minutes, followed by washing sufficiently with water to obtain a pulp. The thus obtained pulp was adjusted to a solid concentration of 1% with ion-exchanged water and agitated for about 60 minutes using a high-speed rotation mixer, to obtain a dispersion of transparent cellulose fibers

[Method 2 of Preparing Cellulose Fibers]

The oxidized pulp obtained by the oxidation reaction in the above [method 1 of preparing cellulose fibers] was well washed with water and weighed so that the solid content was at 4 g. 50 g of a 4% dispersion of Kunipia F prepared according to [dispersion method 2 of layered inorganic compound] described hereinlater, was added to the oxidized pulp. Ion-exchanged water was further added thereto to make a solid content at 1%, followed by agitation for about 20 minutes by use of a high speed rotation mixer to obtain a dispersion containing cellulose fibers and Kunipia F.

[Preparation Method of Polyvinyl Alcohol]

5 g of commercially available PVA product (PVA-124, made by KURARE CO., LTD.) was weighed in a beaker, to which 500 g of pure water was added. This was heated to 100° C. for dissolution to provide a 1% solution.

[Dispersion Method 1 of Layered Inorganic Compound]

Commercially available synthetic mica, PDM-5B (made by Topy Industries, Ltd.), was dispersed in water to make a 3% dispersion.

[Dispersion Method 2 of Layered Inorganic Compound]

Commercially available montmorillonite, Kunipia-F (made by Kunimine Industries Co., Ltd.), was dispersed in water to make a 4% dispersion.

[Method 1 of Preparing Coating Dispersion]

60 g of the 1% PVA solution was weighed in a beaker, to which 3.63 g of a 3% dispersion of synthetic mica under agitation to prepare a mixed dispersion (1) of PVA/synthetic mica=50/10. Moreover, this dispersion was heated and agitated at 80° C. The heating time under agitation was, respectively, set at 1 hour, 2 hours and 4 hours to provide mixed dispersions (2)-(4). While agitating 100 g of the dispersion of the cellulose nanofibers, 53 g of the mixed dispersions (1)-(4) were, respectively, added thereto to give cellulose/synthetic mica/PVA=100/10/50 and well agitated. The respective mixed dispersions (1)-(4) of cellulose, synthetic mica and PVA were provided as coating dispersions (1)-(4). Further, the thus obtained coating dispersions were heated and agitated at 80° C. for 1 hour to provide coating dispersions (5)-(8), respectively.

[Method 2 of Preparing Coating Dispersion]

100 g of a 1% dispersion of cellulose nanofibers was weighed in a beaker. After adequate agitation of the dispersion, 3.3 g of a 3% dispersion of synthetic mica was added under agitation. The resulting dispersion was provided as coating dispersion (9). Next, 50 g of a 1% PVA solution was added to the mixed dispersion to provide coating dispersion (10). Further, this mixed dispersion was heated and agitated at 80° C. for 1 hour to provide coating dispersion (11).

[Method 3 of Preparing Coating Dispersion]

100 g of a 1% dispersion of cellulose nanofibers was weighed in a beaker. This dispersion was well agitated, after which while agitating the dispersion, this was dispersed in coating solution (9), to which 3.3 g of a 3% dispersion of synthetic mica had been added, by means of a ultrasonic homogenizer for 30 seconds. The resulting mixed dispersion was provided as coating dispersion (12).

[Method 4 of Preparing Coating Dispersion]

150 g of the dispersion obtained in the above [Method 2 of preparing cellulose fibers] was weighed in a beaker, to which 50 g of a 1% PVA solution was added while agitating the dispersion. The resulting dispersion was provided as coating dispersion (13). This dispersion was agitated at 80° C. for 1 hour under agitation to provide coating dispersion (14). Moreover, the dispersion obtained in [method 2 of preparing cellulose fibers] was provided as coating dispersion (15).

Examples 2-1-2-12

Preparation of Gas Barrier Films in Examples 2-1-2-12

Gas barrier films were prepared such that coating dispersions (1)-(8), (10), (11), (13) and (14), which were prepared according to such formulation ratios and preparation procedures as set out in the foregoing [Methods 1, 2 and 4 of preparing coating dispersions], were each coated onto a 25 μm thick polyethylene terephthalate film (polyester film E5102, made by TOYOBO CO., LTD.) by a bar coating method in a dry thickness of 1.0 μm, followed by drying to form a gas barrier layer.

[Preparation of Gas Barrier Films for Packaging Material in Examples 2-1 to 2-12]

For use as a packaging material by coating the coating dispersions (1)-(8), (10), (11), (13) and (14) prepared before, a heat-sealing layer was bonded to a gas barrier side through an adhesive layer for lamination according to a dry lamination method and aged at 50° C. for 4 days to prepare a bas barrier film for packaging material. The heat-sealing layer used was 70 μm thick CPP (RXC22, made by Mitsui Chemicals Tohcello, Inc.), and the adhesive used to form the adhesive layer for lamination was a two-component curable polyurethane adhesive for lamination (A525/A52, made by Mitsui Chemicals Polyurethanes, Inc.). The adhesive was coated onto the gas barrier layer by a gravure coating method in an amount of 3.0 g/m$^2$ after drying.

Comparative Examples 2-1-2-3

Preparation of Gas Barrier Films in Comparative Examples 2-1-2-3

Coating dispersions (9), (12) and (15), which were prepared according to such formulation ratios and preparation procedures as set out in the foregoing [Methods 3, 4 of preparing coating dispersions], were each coated onto a 25 μm thick polyethylene terephthalate film (polyester film E5102, made by TOYOBO CO., LTD.) by a bar coating method in a dry thickness of 1.0 μm, followed by drying to form a gas barrier layer thereby providing gas barrier films.

[Preparation of Gas Barrier Films for Packaging Material in Comparative Examples 2-1 to 2-3]

For use as a packaging material by coating the coating dispersions (9), (12) and (15) prepared before, a heat-sealing layer was bonded to a gas barrier side through an adhesive layer for lamination according to a dry lamination method and aged at 50° C. for 4 days to prepare a bas barrier film for packaging material. The heat-sealing layer used was 70 μm thick CPP (RXC22, made by Mitsui Chemicals Tohcello, Inc.), and the adhesive used to form the adhesive layer for lamination was a two-component curable polyurethane adhesive for lamination (A525/A52, made by Mitsui Chemicals Polyurethanes, Inc.). The adhesive was coated onto the gas barrier layer by a gravure coating method in an amount of 3.0 g/m$^2$ after drying.

The properties of the thus obtained gas barrier films were evaluated by the following methods.

[Oxygen Permeability (Equal Pressure Method) (cm$^3$/m$^2$-day-Pa)]

Using an oxygen permeability measuring device MOCON (OX-TRAN2/21, made by Modern Controls Inc), measurement was performed under conditions of 30° C., 40% RH and 70% RH. The results of the measurement of oxygen permeability of the gas barrier films are shown in Table 3.

[Measurement of Water Vapor Permeability]

The water vapor permeability (g/m$^2$-day) was measured under conditions of 40° C. and 90% RH using a water vapor permeability measuring device PERMATRAN W-3/33MG (made by Modern Controls, Inc.). The results of the measurement of water vapor permeability of the gas barrier films are shown in Table 3.

The laminate strength of each gas barrier film for packaging material was evaluated according to the following method.

[Measurement of Adhesion Strength]

The respective three-layered laminates were cut out into rectangular test pieces having a width of 15 mm×a length of 10 cm. The test pieces were each subjected to measurement of adhesion strength (N/15 mm) between the substrate and the PP film in accordance with the method of JIS-K-7127 wherein T-shape peeling was effected at a tensile speed of 300 mm/min. The results of the measurement of adhesion strength of the gas barrier film for packaging material are shown in Table 4. Further, the results of the measurement of oxygen permeability and water vapor permeability are also shown in Table 4.

TABLE 3

EVALUATION RESUTS OF GAS BARRIER FILM

|  | Oxygen Permeability 30° C., 70% RH (cc/m²-day) | Water vapor permeability 40° C., 90% RH (cc/m²-day) |
|---|---|---|
| Example 2-1 | 1.0 | 13.9 |
| Example 2-2 | 0.9 | 13.8 |
| Example 2-3 | 0.9 | 13.9 |
| Example 2-4 | 1.0 | 13.9 |
| Example 2-5 | 0.9 | 14.0 |
| Example 2-6 | 0.9 | 14.0 |
| Example 2-7 | 0.9 | 14.0 |
| Example 2-8 | 1.0 | 14.1 |
| Example 2-9 | 1.1 | 15.1 |
| Example 2-10 | 1.1 | 14.8 |
| Example 2-11 | 3.1 | 15.1 |
| Example 2-12 | 2.8 | 14.3 |
| Comparative Example 2-1 | 1.3 | 20.8 |
| Comparative Example 2-2 | 2.1 | 22.1 |
| Comparative Example 2-3 | 5.1 | 15.8 |

TABLE 4

EVALUATION RESUTS OF GAS BARRIER FILM FOR PACKAGING MATERIAL

|  | Oxygen Permeability 30° C., 70% RH (cc/m²-day) | Water vapor permeability 40° C., 90% RH (cc/m²-day) | Adhesion strength (N/15 mm) |
|---|---|---|---|
| Example 2-1 | 0.93 | 6.4 | 0.9 |
| Example 2-2 | 0.84 | 6.4 | 0.9 |
| Example 2-3 | 0.91 | 6.4 | 0.9 |
| Example 2-4 | 0.95 | 6.3 | 0.9 |
| Example 2-5 | 0.91 | 6.3 | 0.9 |
| Example 2-6 | 0.87 | 6.3 | 0.9 |
| Example 2-7 | 0.94 | 6.4 | 0.9 |
| Example 2-8 | 0.99 | 6.4 | 0.9 |
| Example 2-9 | 1.05 | 6.4 | 0.6 |
| Example 2-10 | 1.03 | 6.4 | 0.6 |
| Example 2-11 | 2.85 | 6.3 | 1.7 |
| Example 2-12 | 2.72 | 6.4 | 1.7 |
| Comparative Example 2-1 | 1.23 | 6.3 | 0.2 |
| Comparative Example 2-2 | 2.08 | 6.4 | 0.2 |
| Comparative Example 2-3 | 4.87 | 6.4 | 1.3 |

The comparison of Examples 2-1-2-10 using synthetic mica as the layered inorganic compound with Comparative Examples 2-1, 2-2 and also of Examples 2-11, 2-12 using montmorillonite with Comparative Example 2-3 revealed that the addition of PVA enhanced the dispersibility of the layered inorganic compound and contributed to expanding the layer-to-layer gap of the layered inorganic compound thereby improving barrier properties. Further, the addition of PVA could fill the gaps among the cellulose nanofibers, layered inorganic compound and base material thereby improving adhesion.

In view of Examples 2-2-2-4 and 2-6-2-8 wherein the heating and agitating time was changed, it was found that if the time was elongated, the layered inorganic compound became too small in size, with the tendency that barrier properties lowered slightly.

Furthermore, the comparison between Examples 2-1-2-10 using synthetic mica as the layered inorganic compound and Comparative Example 2-2 revealed that the layered inorganic compound was broken down by treatment with a homogenizer, so that barrier properties lowered considerably.

The comparison of Examples 2-1, 2-2 with Examples 2-9, 2-10 demonstrated that because the layered inorganic compound had higher affinity for PVA than for cellulose nanofibers, the addition of cellulose nanofibers after preliminary mixing of PVA and layered inorganic compound leads to better dispersability, resulting in better barrier properties.

EXPLANATION OF REFERENCE NUMERALS

1 . . . Base material
2 . . . Gas barrier layer
4 . . . Adhesive layer for lamination
6 . . . Heat sealing layer

The invention claimed is:

1. A composition for film formation comprising:
cellulose fibers;
a water-soluble polymer; and
a swollen layered inorganic compound.

2. A laminate, comprising:
a base material; and
a layer laminated on at least one surface of a base material and obtained by drying a composition for film formation comprising cellulose fibers, a layered inorganic compound in a swollen state, and a water-soluble polymer, the layered inorganic compound having remained in the layer as a layered inorganic compound upon completion of the drying.

3. A film obtained by:
drying a composition comprising cellulose fibers, a layered inorganic compound in a swollen state, and a water-soluble polymer, the layered inorganic compound having remained in the film as a layered inorganic compound upon completion of the drying.

4. A sheet base material made up of the film according to claim 3.

5. A packaging material made up of the film according to claim 3.

6. A packaging material made up of the sheet base material according to claim 4.

7. A method for preparing the composition for film formation according to claim 1, comprising:
mixing a dispersion of a swollen layered inorganic compound and a dispersion containing cellulose fibers having an average particle size of not larger than 300 nm, the layered inorganic compound having an average particle size of not less than 0.5 μm to not larger than 7 μm in dry state.

8. The composition for film formation according to claim 1, wherein
the water-soluble polymer and the cellulose fibers are intercalated between the interlayer gaps of the swollen layered inorganic compound.

9. The composition for film formation according to claim 1, wherein width of the cellulose fibers is within a range of between not less than 1 nm and not larger than 50 nm.

10. The composition for film formation according to claim 1, wherein average size of the swollen layered inorganic compound is from not smaller than 0.5 μm to not larger than 10 μm.

11. The laminate according to claim 2, wherein in the layer obtained by the drying, the water-soluble polymer and the cellulose fibers are intercalated between interlayer gaps of the layered inorganic compound.

12. The film according to claim 3, wherein in the film obtained by the drying, the water-soluble polymer and the cellulose fibers are intercalated between interlayer gaps of the layered inorganic compound.

13. The composition for film formation according to claim 1, wherein individual gaps between layers of the layered inorganic compound are not less than 14 angstroms.

14. The laminate according to claim 2, wherein in the layer obtained by the drying, individual gaps between layers of the layered inorganic compound of the laminate are not less than 14 angstroms.

15. The film according to claim 3, wherein in the film obtained by the drying, individual gaps between layers of the layered inorganic compound of the film are not less than 14 angstroms.

* * * * *